（12）United States Patent
Patnam et al.

(10) Patent No.: US 9,281,963 B2
(45) Date of Patent: Mar. 8, 2016

(54) METHOD AND SYSTEM FOR EMAIL SEARCH

(75) Inventors: Prashanth Patnam, Pune (IN); Ajay Deshpande, Pune (IN); Jitendra Gokhale, Pune (IN); Vinod Kulkarni, Pune (IN)

(73) Assignee: PERSISTENT SYSTEMS LIMITED, Pune (IN)

( * ) Notice: Subject to any disclaimer, the term of this patent is extended or adjusted under 35 U.S.C. 154(b) by 720 days.

(21) Appl. No.: 12/645,057

(22) Filed: Dec. 22, 2009

(65) Prior Publication Data
US 2010/0169320 A1  Jul. 1, 2010

(51) Int. Cl.
*G06F 17/30* (2006.01)
*H04L 12/58* (2006.01)

(52) U.S. Cl.
CPC ...... *H04L 12/5885* (2013.01); *G06F 17/30696* (2013.01); *H04L 51/34* (2013.01); *H04L 12/585* (2013.01)

(58) Field of Classification Search
CPC ..................................................... G06F 17/30
USPC ......... 707/696, 711, 736–738, 740, 741, 754, 707/758, 999.001–999.003
See application file for complete search history.

(56) References Cited

U.S. PATENT DOCUMENTS

| | | | | |
|---|---|---|---|---|
| 7,680,856 | B2 * | 3/2010 | Qureshi | 707/722 |
| 7,895,208 | B2 * | 2/2011 | Konopnicki | 707/738 |
| 8,504,559 | B1 * | 8/2013 | Elman | G06Q 30/08 705/321 |
| 2003/0061209 | A1 * | 3/2003 | Raboczi et al. | 707/3 |
| 2005/0149500 | A1 * | 7/2005 | Marmaros et al. | 707/3 |
| 2005/0154723 | A1 * | 7/2005 | Liang | 707/3 |
| 2006/0031350 | A1 * | 2/2006 | Levi et al. | 709/206 |
| 2006/0080303 | A1 * | 4/2006 | Sargent et al. | 707/3 |
| 2006/0136419 | A1 * | 6/2006 | Brydon et al. | 707/9 |
| 2006/0173957 | A1 * | 8/2006 | Robinson et al. | 709/204 |
| 2008/0077571 | A1 * | 3/2008 | Harris et al. | 707/5 |
| 2008/0270351 | A1 * | 10/2008 | Thomsen | 707/2 |
| 2008/0306959 | A1 * | 12/2008 | Spivack et al. | 707/9 |
| 2009/0100073 | A1 * | 4/2009 | Dargahi et al. | 707/100 |
| 2009/0234891 | A1 * | 9/2009 | Nelson et al. | 707/200 |
| 2010/0070485 | A1 * | 3/2010 | Parsons | G06F 17/30864 707/709 |
| 2012/0221596 | A1 * | 8/2012 | Hall et al. | 707/769 |

* cited by examiner

*Primary Examiner* — Miranda Huang
(74) *Attorney, Agent, or Firm* — Foley & Lardner LLP

(57) ABSTRACT

A method and system for performing email search, the said method comprising of enabling the user to find relations between emails and build network relations and to further retrieve groups based on the relations (and intersections of relations) as per the user's choice; the system comprising of giving and having the user select predetermined options for a search with a further ability to "drill-down" the results with the aid of filters to view further mails/results, and being also able to search on search results and also provide for storing user searches.

36 Claims, 14 Drawing Sheets

METHOD AND SYSTEM FOR EMAIL SEARCH

RELATED APPLICATION

This application claims priority to Indian Provisional Application No. 2669/MUM/2008, filed on Dec. 23, 2008, the disclosure of which is incorporated herein by reference in its entirety.

FIELD OF THE INVENTION

The invention relates generally to the field of communication management, more particularly management of email communications, and related data such as conversation threads, files exchanged, related people, related domains and like. In particular, the invention relates to a technique and system for performing email communication and related data search. The methods and systems also relate to building of social network based on the relations between email communications and related data from the user's mailbox.

BACKGROUND OF THE INVENTION

Over the time, email communications have become very critical to businesses and at the same time their volumes are increasing. This is particularly so with information technology workers, where receiving, for example, hundreds of emails a day, has become a none. To add to it, users do not delete any email communications because storage is cheap or for its future need. This causes communication overload and has become difficult to manage or retrieve it when necessary. Searching for a particular email communication or related data in such haystack hence has become an important activity and has become very hard and time consuming.

For example, most email systems today provide ability to search for emails. They provide for the usual search mechanisms such as time period based search, keyword based search, headers (from, to, cc) based search, etc. Plain search does not work any more as it takes lot of time. In keyword based search, it allows for searching for keywords occurring in the emails, either in the headers or the bodies of the email or both. The user has to come up with creative keywords to address complex searches. Despite this, the keywords used for searching are common place resulting in too many results requiring further time to retrieve the required email and related data. In the header based search, users are able to sort on the headers and then drill down for more information. However, this search too is time consuming. In certain email systems tagging or folder based searches are also used. In such case the user moves (or simply attaches a tag to) the email to container called a folder so that in future when the user wants to look at emails on a particular topic, a search can be made only in the relevant folder. However, folder concept is obsolete for its obvious reasons. Tagging labeling cannot be done for all mails. Simply reviewing large volumes of emails demands excessive time.

Further, current email search engines respond with emails as result even if the user is interested in the people involved in such email communications. For example, to find a particular person or the person's domain address, the user needs to find the specific email and then open that email to find the people involved in that email and identify the required person.

As a result, users are often overloaded with email communications with related data and less time at hand for searching them, when needed. This makes the process of sifting through email communications time consuming and inefficient. Therefore, a need exists for methods and systems to efficiently assist the user when searching for a particular email communication or related data. Specifically, an efficient system that provides user with the ability to retrieve a particular email communication or related data with greater ease, at a much lower cost of operations, is needed to address current email communication search limitations.

SUMMARY OF THE INVENTION

As outlined above, a clear need exists for efficient and quick methods and systems for searching a particular email communication or related data such as, but without limiting it to, conversation threads, files exchanged, related people, type of connection, groups, and related domains (generally, related data) in haystack of email communications. Additionally, the ability to simultaneously build social network from one's mailbox with greater flexibility is an important aspect of the present invention. Techniques that allow a user to retrieve a particular email communication, or related data are described in more detail below. The present invention brings in different approach to search email communications or related data. The key aspect behind this is the way humans look for email communications. Typically people remember context about an email communication and not the specifics. The present invention enables the user to search different email communications, or related data and also to understand the type of connection shared with the corresponding person for e.g. direct connection (both have sent an email to each other at least once), one-way connection, and indirect connection. To further the objects of the present invention, the methods and systems disclosed herein work as an ad-on that can work in a complementary mode with all other online email messaging services or email related products, and can be the search infrastructure alongside the main email messaging system.

In general, as one aspect of the present invention, a context based searching facility is provided whereby email communications or related data are indexed based on the relationships entailed by the communication. Email communications or related data can then be searched with the aid of various views or filters as may be applied by the user to retrieve the desired email communication or related data. The search for email communication or related data is thus speeded up by the index thus created. The ability to switch between different views, pre-determined or "created", to get the corresponding result or to apply different filters simultaneously, or at various levels, is also an important aspect of the present invention.

At the same time, the user being provided with pre-determined views or wide range of filters or parameters, or the ability to use any combination of such pre-determined views or filters to search simultaneously or in steps to retrieve the desired email communication or related data reflects another aspect of the present invention. In accordance with an embodiment of the present invention, a user can "create" and "save" a context for later use if the user is satisfied with the search so that new email communications or related data that are downloaded can be automatically classified into matching contexts. So also the ability to allow searching on multiple mailboxes simultaneously is provided for.

It is another aspect of the present invention to be able to implement and use the invention in group and provide collaborative search capabilities within the group. When people use the implementation of the present invention in group, search can be conducted for email communications or related data that were sent to the group. It is a further embodiment of the present invention to provide individual users the ability to search for email communications and to "create" and "save" contexts, and make them available to other individuals in the group.

In yet another aspect of the present invention, the email communications or related data from a messaging server is up to date and realtime so that the latest of the communications are available to the user for retrieval.

In the embodiment of the present invention, pre-determined views and various filters or parameters provided to the user may include, but without limiting it to, email communication addresses or domain addresses, related people, number of persons involved in a conversation, attachments, from, to, cc, bcc, date, time, subject, headers, keywords in the communication, folders, conversation thread, enhanced search such as boolean search, fuzzy search, phrase search or wild card search, and like.

As has been stated above, the ability to simultaneously build social network from one's mailbox with greater flexibility is an important aspect of the present invention. This helps the user in finding hidden groups of people and the domains. User can also understand the type of connection shared with the corresponding person, the connections being of different types in which the user can be connected to other person. For e.g. direct connection (both have sent an email to each other at least once), one-way connection, and indirect connection. The further ability to find group of domains talking to each other from the user's mailbox or even find a group of people belonging to a particular domain refers to a further aspect of the present invention. In an embodiment of the present invention, such network, groups of people, domains, or connection types can be represented/displayed to the user graphically.

One other aspect of the present invention is to utilize less memory. The ability to store the contexts or relations between email communications or related data in form of index and applying them or filters only upon user's request, rather than physically moving the email communications or related data at synchronization time, refers to an important aspect of the present invention. What is done in the embodiment of the present invention is only to index email communications or related data against the relationships, pre-determined or "created", or applying filters as desired, only at runtime on the messaging server(s) when the user makes a request.

It is yet another aspect of the present invention to provide an interface (GUI) that is user friendly and to provide a search system that is very fast and efficient.

It should be understood that the terms "a," "an," and "the" mean "one or more," unless expressly specified otherwise.

The other additional aspects, advantages, and/or novel features of the invention, which can be more apparent to those skilled in the art, are set forth in following description of the invention.

The foregoing, and other features and advantages of the invention, as well as the invention itself, will be more fully understood from the description, drawings, and claims which follow.

BRIEF DESCRIPTION OF THE DRAWINGS

The aspects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views. The drawings associated with the disclosure are addressed on an individual basis within the disclosure as they are introduced.

The claimed invention will be more completely understood through the following detailed description, which should be read in conjunction with the attached drawings. In this description, like numbers refer to similar elements within various embodiments of the invention.

DETAILED DESCRIPTION OF THE PREFERRED EMBODIMENT

The following description refers to the accompanying drawings that illustrate certain embodiments of the invention. Other embodiments are possible, and modifications may be made to the embodiments without departing from the spirit and scope of the invention. Therefore, the following detailed description is not meant to limit the invention. Rather, the scope of the invention is defined by the claims.

It should be understood that the order of the steps of the methods of the invention is immaterial so long as the invention remains operable. Moreover, two or more steps may be conducted simultaneously or in a different order than recited herein unless otherwise specified.

The aspects and embodiments of the invention disclosed herein relate to storing, organizing, indexing and retrieving email communication(s) or related data that is desired by the user based on the request made. Typically, the systems and methods described herein are implemented using software, memory elements, and associated processing elements. The data repositories and user interfaces described herein can be local or networked in various embodiments.

Aspects of the invention provides a unique method and system for performing email communications and related data search so also build a social network from the user's mailbox, whereby helps the user in finding hidden groups and connections. The methods and systems of the invention provide greater flexibility to the user in terms of their ability to quickly and efficiently search email communications or related data such as, but without limiting it to, conversation threads, files exchanged, related people, type of connection, groups, and related domains (generally, related data). Users can also use the systems and methods disclosed herein to understand the type of connection that the user shares with corresponding person for e.g. direct connection, one-way connection, or indirect connection or for finding groups. The methods and system of the invention are described in more detail below.

Prior to considering the details relating specific examples and implementations of the invention, it is advantageous to establish a general framework by which a particular embodiment operates. A general overview of the components of an exemplary system suitable for performing search of email communications or related data is depicted in FIG. 1.

Figure 1:
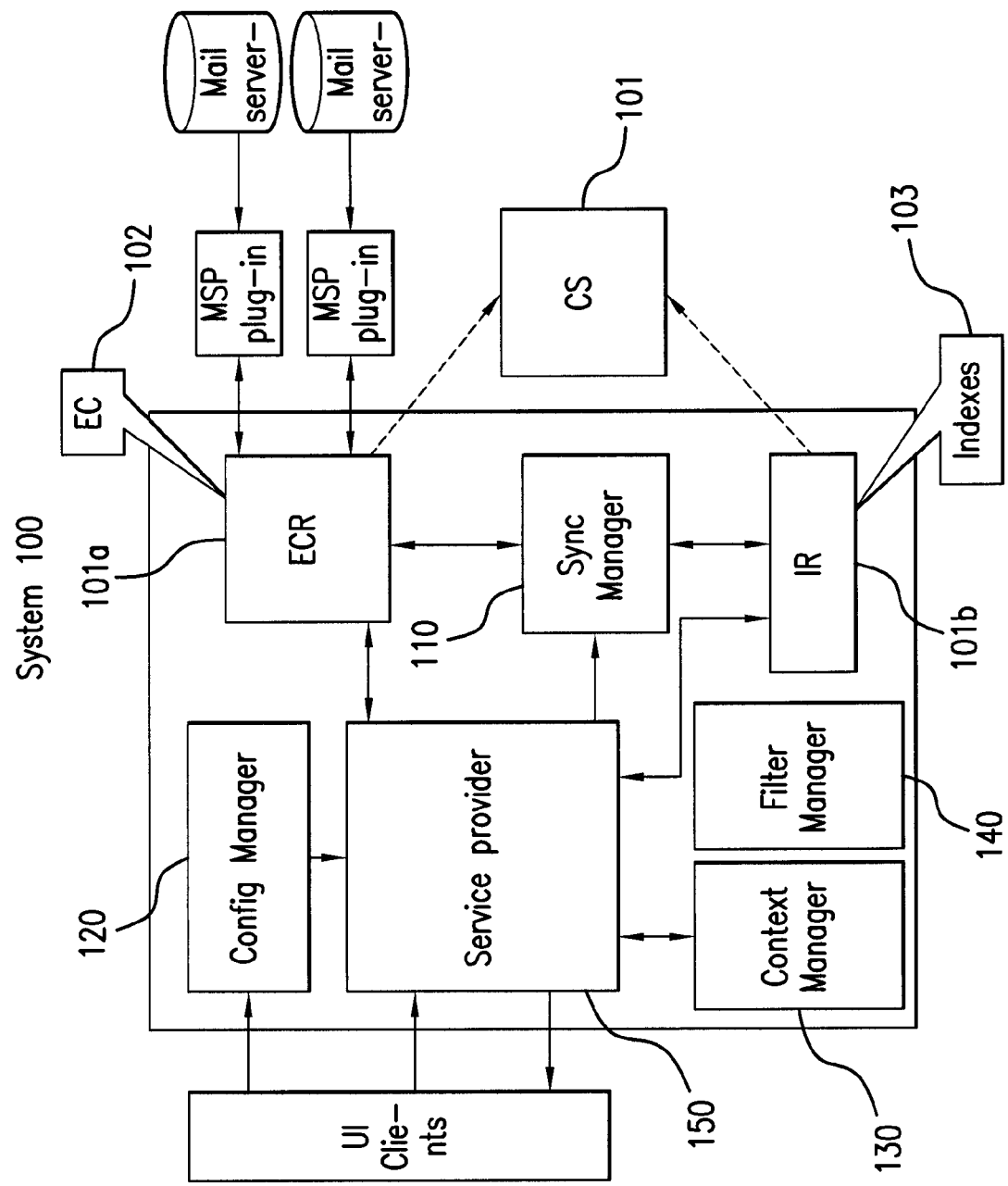
FIG. 1 is a block diagram illustrating a system according to an illustrative embodiment of the invention.

In particular, FIG. 1 is a block diagram illustrating an exemplary system 100 for practicing one or more aspects of the invention. As described in more detail below, the system 100 is suitable for the user to perform email communications or related data search quickly and efficiently, and to find groups of people, domains, and like and to understand the type of connections the user shares with the corresponding person. Typically, embodiments of the system 100 include at least one of a data storing, a data retrieving, and a data processing component.

The system 100 can include email communications or related data repository 101a and an index repository 101b. As shown, the system 100 also can include a service processing module 150. The system 100 may also include manager modules such as, but without limiting it to, synchronizing module 110, configuration manager module 120, context manager module 130, and filter manager module 140. Typically, a process or module described herein can also be performed using one or more sub-processes or combined as part of another process.

In one embodiment, the system 100 is implemented using one or more environments. An environment generally refers to the interfaces and data exchange mechanisms that enable a user to interact with the system 100 and generate search results. One implementation of the system uses a distributed-split environment that includes a single memory storage and transmission component at one location in conjunction with multiple processing locations connected together through a network. Alternatively, the system 100 can be implemented using a single environment that involves a single storing, retrieving and processing location. Other configurations as appropriate for implementing a software environment locally, via a network, or using distributed processing are also within the scope of the invention.

Still referring to FIG. 1, the system 100 includes an email communications or related data repository ("ECR") 101a. The ECR 101a can include, but is not limited to an optical storage drive, a disk drive, a magnetic drive, or any other suitable repository for storing various data. The ECR 101a may be maintained at a remote location from the processing locations or the user locations. In one embodiment, the ECR 101a is a segregated portion of a large single central server ("CS") 101 for data access and processing enabled with appropriate database access software. Additionally, the CS 101 can be any type of data repository such as that described with respect to repository 101a. The ECR 101a, in one embodiment, may be a corporate messaging server or web based messaging server.

Thus, email communications or related data (generally, "EC") 102 can be stored and transmitted via the ECR 101a, the CS 101 or portions and combinations thereof. Email communications 102 also includes related data such as, but without limiting it to, conversation threads, files exchanged, related people, type of connection, groups, and related domains, email conversation addresses or domain addresses, number of persons involved in a conversation, from, to, cc, bcc, date, time, subject, headers, keywords in the communication, folders, and like, which is otherwise relevant for the purposes of the user's retrieval of the email communication. Typically, search is to be performed on such vast data so as to retrieve the desired email communication or related data 102, quickly and efficiently. Methods and systems for providing email communications or related data 102 are described in more detail below.

Email communications or related data 102 can be collected or collated by known means and stored for further use in the ECR 101a or the CS 101. In another embodiment, email communications or related data 102 is automatically collected into the ECR 101a or CS 101. Various known procedures for collecting or collating and then storing the EC 102 in the ECR 101a or CS 101 can be used. Methods such as IMAP, POP can be followed to automatically collect EC 102 into the ECR 101a or CS 101. In one embodiment, the EC 102 can be collected or collated into the ECR 101a or CS 101 simultaneously from one or more messaging servers with the aid of known means and connectors.

In one embodiment, the email communications 102 is collected, compiled and stored in the ECR 101a or CS 101 in a continuous manner to provide the most updated email communications 102 to the user. In turn, the email communications 102 can be indexed based on pre-determined relationships entailed in the communication, and can be searched with reference to views, pre-determined contexts or "created" contexts or with the aid of various filters as may be applied by the user to retrieve the desired email communication or related data 102.

Indexes are generated based on pre-determined relationships. They can be searched with the aid of various filters as may be applied by the user. As such, the system 100 can also include an index repository ("IR") 101b. The index repository 101b can be of any type of repository suitable for storing data as was described with reference to repositories 101a and 101. In one embodiment, the index repository 101b is a segregated portion of the CS 101. However, other non-server based approaches for the overall system 100 can also be implemented. In a preferred embodiment, the IR 101b is a Lucene store used for generating and storing indexes.

For example, index repository 101b can also be located at a different location than ECR 101a or CS 101, and can be stored in any type of repository as described above, but should be accessible to the system 100. IR 101b, or such portions of CS 101, includes indexes 103 generated based on relationship entailed in the communication, and can be searched with reference to views, pre-determined contexts or "created" contexts or with the aid of various filters as may be applied by the user. It is an important aspect of the present invention that IR 101b requires or utilizes less memory storage as it is able to store the contexts or relations between email communications 102 in form of indexes 103 and apply them or filters only upon user's request, rather than physically moving the email communications 102 at synchronization time. What is done in the embodiment of the present invention is only to index email communications 102 against their relationships and to apply contexts, pre-determined or "created", or filters as desired, only at runtime on the ECR 101a when the user makes a request. Additional details relating to how listings are generated is described in more detail below.

Further referring in FIG. 1, the service processor 150 of the system 100 may also involve known manager modules such as, but without limiting it to, synchronizing module 110, configuration manager module 120, context manager module 130, and filter manager module 140. The configuration manager module 120 processes the user configurations and maintains user profile, user registration and like. It stores user registration information and gives it back to the user when asked. Further, context manager module 130 invokes correct plug-ins based on type of requirement of the user and gives back the result. Similarly, the filters are managed by filter manager 140.

In the embodiment of the invention, the synchronization module 110 synchronizes user account i.e. newly fetched emails, and keeps the index repository 101b up-to-date in realtime. Since providing up-to-date email communications 102 of interest to the user, the system 100 can perform regular updates that check for the availability of the latest email communications 102. These updates can be triggered at pre-determined intervals or based upon certain events. In accordance with one aspect of the invention, automated tools are deployed along with a computer program-based implementation of the system 100 to ensure that updates regarding the email communications 102 are made. Additionally, proper procedures with respect to notification of the avail ability of the latest communications can also be implemented. If the user separately maintain any of the repositories as described in FIG. 1, such checks for updated communications may require regulated access systems to be used in the overall system.

In the overall system 100, taking of the request from the user, processing the same, and returning the request as desired is performed by service process module 150. Still referring to FIG. 1, the system 100 includes steps of taking request from the user and such step or steps associated with the processing of user request can be performed using choices from the user as inputs. The different repositories and categories of elements represent a collection of constituents that can be processed to perform the search. Thus, once all the email communications 102, views, contexts, filters are available to the user of the system, the service process module 150 can be used to process and display the results in form of listings desired by the user in response to inputs made by the user.

The listing building process module of the system 100 generates listings, after accessing the email communications repository 101a, based on the relation of email communications 102 with reference to pre-determined views. Pre-determined views may include, but without limiting it to, email communication addresses or domain addresses, related people, number of persons involved in a conversation, attachments, from, to, cc, bcc, date, time, subject, headers, keywords in the communication, folders, conversation thread, enhanced search such as boolean search, fuzzy search, phrase search or wild card search, and like. In the preferred embodiment, pre-determined views may include, but without limiting it to, people involved, domain addresses involved, mails involved, filters, and contexts. The implementation of this feature of the preferred embodiment can be shown in FIG. 2a.

In another embodiment, the user can switch between different views, pre-determined or "created", to get the corresponding result or to apply different range of filters simultaneously, or at various levels to retrieve the desired email communication 102. The user can also use any combination of such pre-determined views or "created" contexts or filters to search simultaneously or in steps to retrieve the desired email communication 102. The user can search on multiple mailboxes simultaneously. In another embodiment, the user can search for email communications 102 as a part of group and within the group, can search for email communications 102 that were sent to the group. Such user can "create" and "save" contexts, and make them available to other users in the group. Further details relating to the techniques and methods of performing a search is described in more detail below.

While considering the illustrative details and implementations of invention, the techniques and methods of performing search and the ability to build social network and understand connections are also detailed.

Figure 2A:
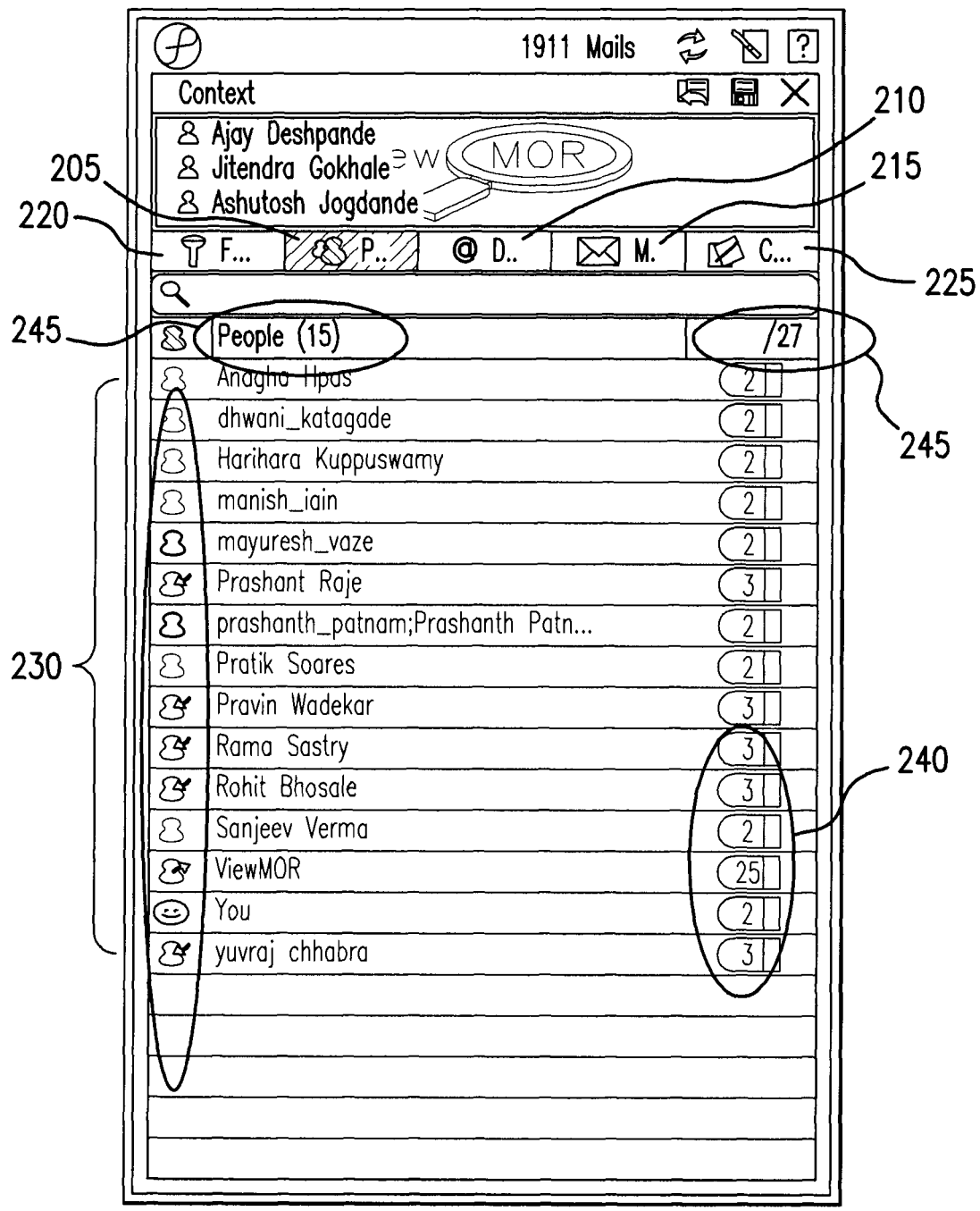
FIG. 2a is a screen shot illustrating aspects of the invention providing filter view, people based view, domain based view, mail based view, context view, and listings generated thereby along with techniques thereto and social network building features that can be implemented according to an illustrative embodiment of the invention.
Figure 2B:
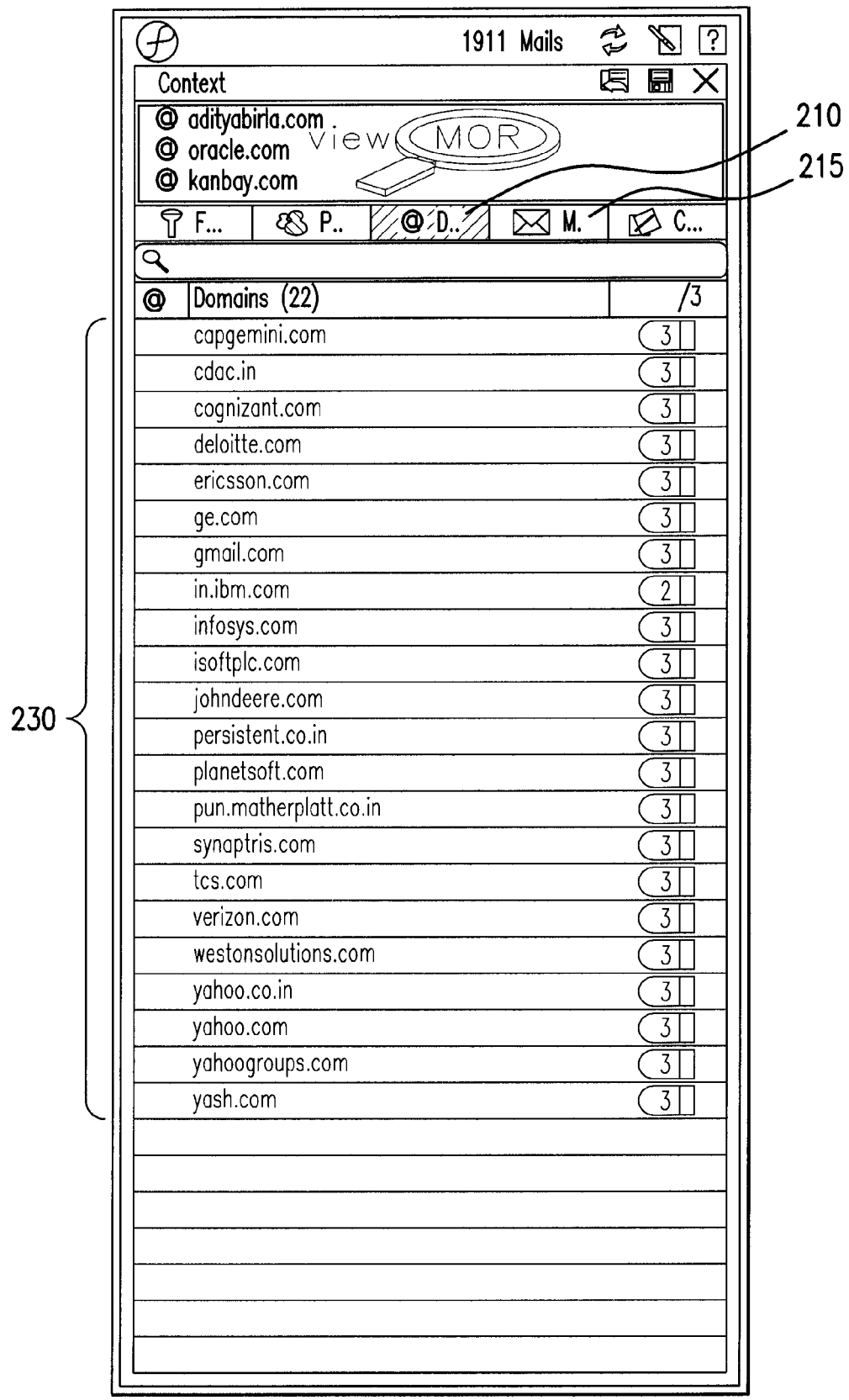
FIG. 2b is a screen shot illustrating an aspect of the invention providing domain based view and mail based view that can be implemented according to an illustrative embodiment of the invention.

With reference to FIG. 2a, pre-determined views include, but without limiting it to, people involved 205, domain addresses involved 210, mails involved 215, filters 220. In a people based view 205, all people the user is communicating via email can be found and listed 230 with the email communications those people are involved, which is separately listed in mail based view 215. This list in the mail based view 215 is available to the user on switching from people based view 205 to mail based view 215. Similarly, with reference to FIG. 2b, for domain based view 210, it finds out the domains involved and lists 230 against the email communications those domains are involved in separately listed in mail based view 215. For the said purposes, the user can start with or without applying any views 220/205/210 at the beginning.

Still referring to FIG. 2a, in an embodiment of the invention, the user can further drill down or search on the search results to retrieve the desired email communications. In a preferred embodiment, the list 230 generated in the people based view 205 provides details of email communications such as number of email communications 240 and like, in which the said person listed in the list 230 is involved in. The user can be provided to be able to further drill down or search on the search result by enabling clicking on the number 240 to get all the relevant email communications.

According to the present invention, the user is able to simultaneously build social network from the email communications with greater flexibility. It also enables the user to find groups of people and understand the type of connection shared with the corresponding person for e.g. direct connection (both have sent an email to each other at least once), one-way connection, and indirect connection. This feature of the invention can be illustratively demonstrated as is shown in FIG. 2a. In the list 230 generated in the people based view 205, which lists all people the user is communicating via email or are involved in, iconic representations 250 can be provided to enable the user understand the way that person is connected with the user. Similarly, numeric representations 245 can be provided to indicate details such as the number of people related to a group along with number of emails exchange in the context. Any desired coding methods can be adopted to depict direct connection (both have sent an email to each other at least once), one-way connection, and indirect connection. In an embodiment of the present invention, such network, groups of people, domains, or connection types of the user and people involved can be represented/displayed to the user graphically.

In an embodiment of the invention, the user is enabled to send email communications directly to the persons concerned when the user enters the people based view 205 by known methods such as providing for a command on right click of the mouse and like.

Figure 2C:
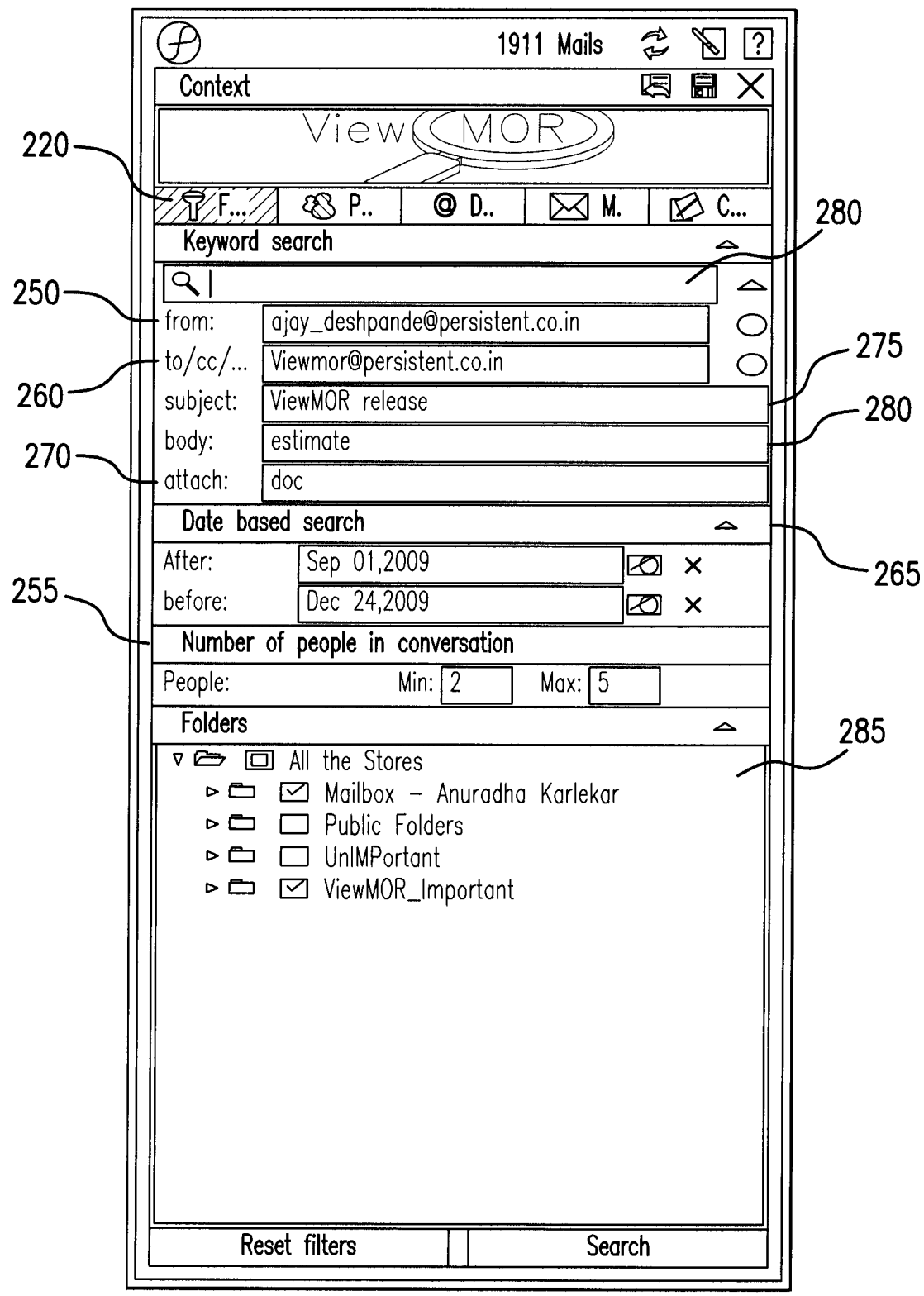
FIGS. 2c and 2d illustrates various filters or parameters that can be provided to the user in accordance with the illustrative implementation of the present invention.
Figure 2D:
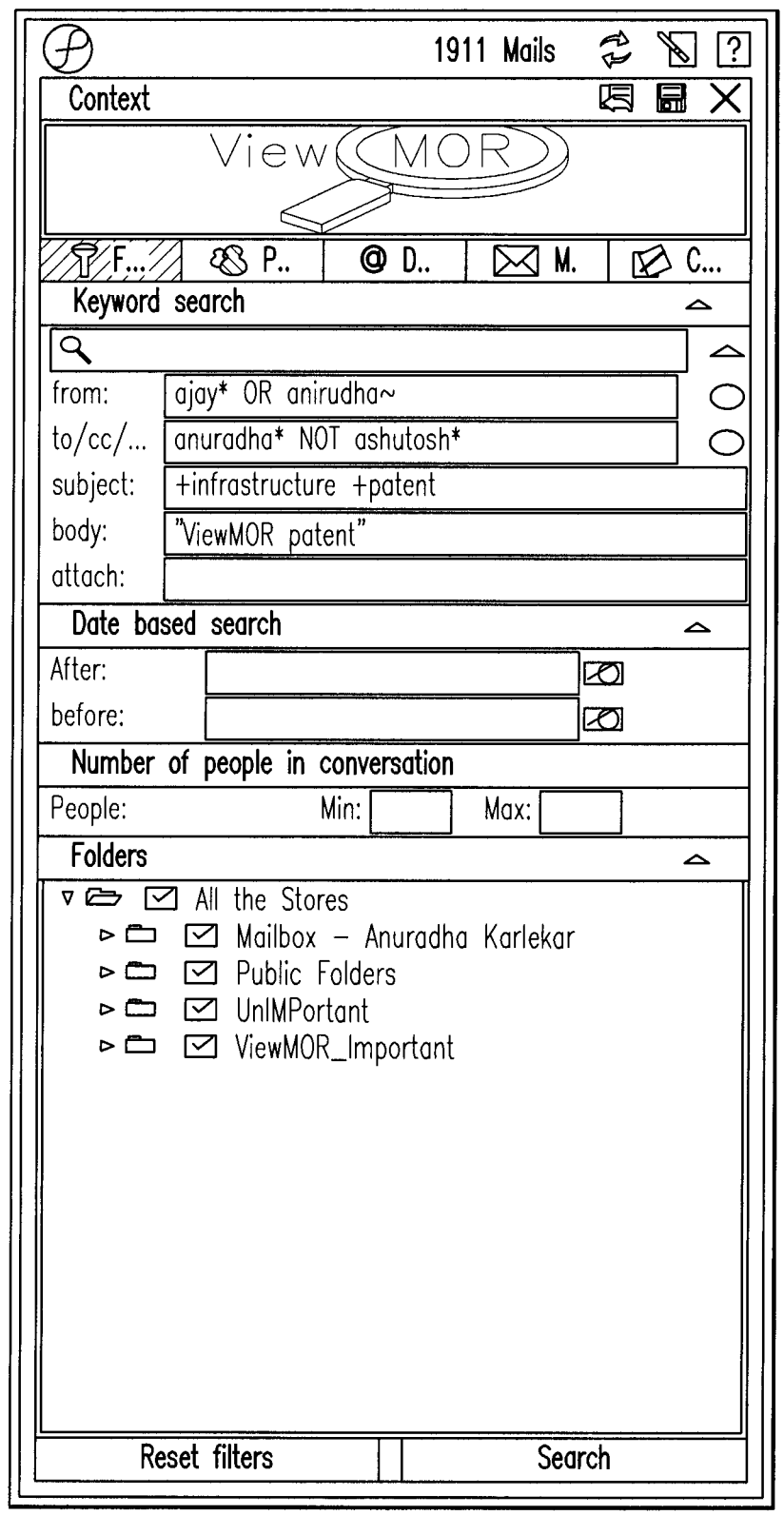

Referring to FIG. 2a again, in another embodiment, a user can be provided filter view 220, which may include wide range of filters or parameters that the user may apply, singly or in combination of one or more filters, upon the EC 102 to retrieve or further filter the search results. Wide range of filters that can be provided to the user may include, but without limiting it to, email communication addresses or domain addresses, related people, number of persons involved in a conversation, attachments, from, to, cc, bcc, date, subject, headers, keywords in the communication, folders, conversation thread, enhanced search such as boolean search, fuzzy search, phrase search or wild card search, and like. The implementation of this feature of the embodiment can be shown in FIGS. 2c to 2d. As can be seen in FIG. 2c, various filters or parameters can be provided to the user, which may include, but without limiting it to, email communication addresses or sender's name 250, number of persons involved in a conversation 255, attachments 270, to or cc or bcc or receiver's name 260, date 265, subject 275, keywords in the communication (either in body or generally) 280, folders 285. In another embodiment, in filters 220 the user is able to conduct a search based on "logical expressions, wildcards and fuzzy expressions" search. For example, user can search for email communications sent by a person for e.g. Ajay, having another persons e.g. Anirudha and Anuradha, but not a particular person e.g. Ashutosh, in the distribution list. This illustrative implementation of this feature of the invention is shown in FIG. 2d.

Still referring to FIG. 1, in another embodiment, a user can "create" and "save" a context for using indexes 103 at later date if the user is satisfied with the search, so that new email communications 102 that are downloaded can be automatically classified into matching contexts. Such customized or "created" and "saved" contexts can be saved and listed in a pre-determined view 225 as is shown in FIG. 2a. The method and technique of "creating" and "saving" a context is illustrated in FIGS. 3a to 3g. The techniques and method of performing an email communication or related data search is also illustrated with FIGS. 3a to 3e.

Figure 3A:
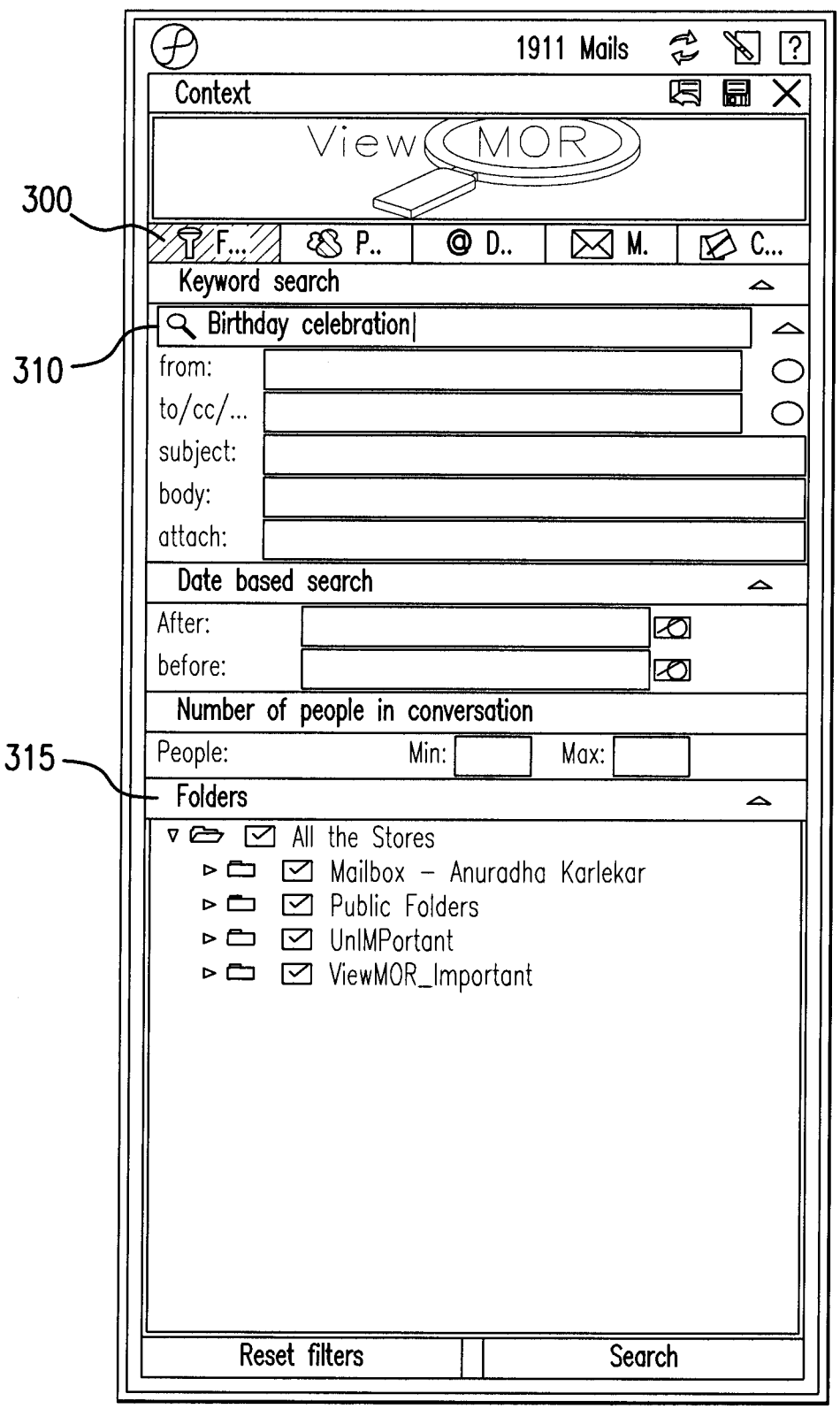
FIGS. 3a to 3g illustrates the methods and techniques of "creating" and "saving" a context and of performing an email communication or related data search in accordance with the illustrative implementation of the present invention.
Figure 3B:
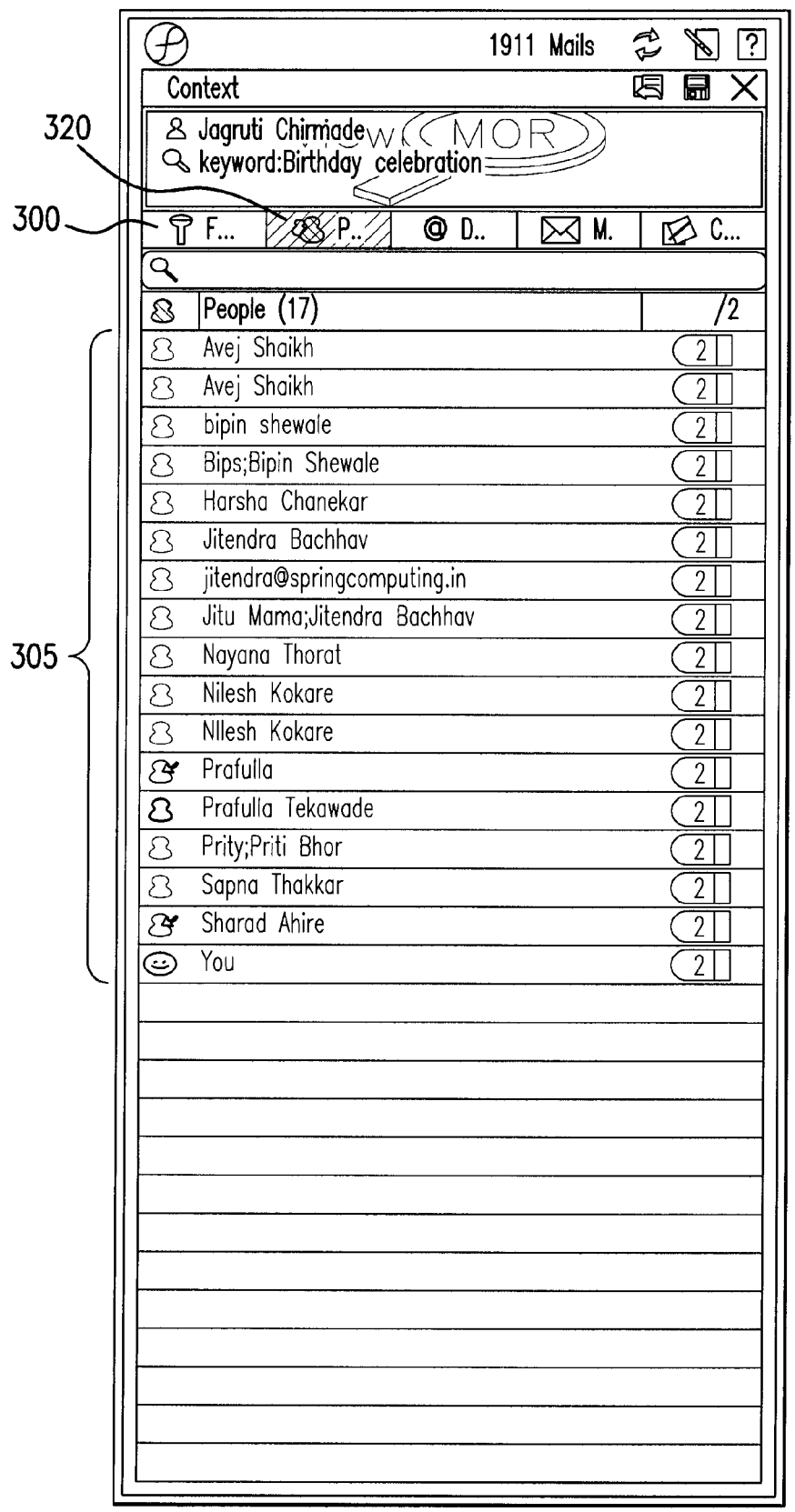
Figure 3C:
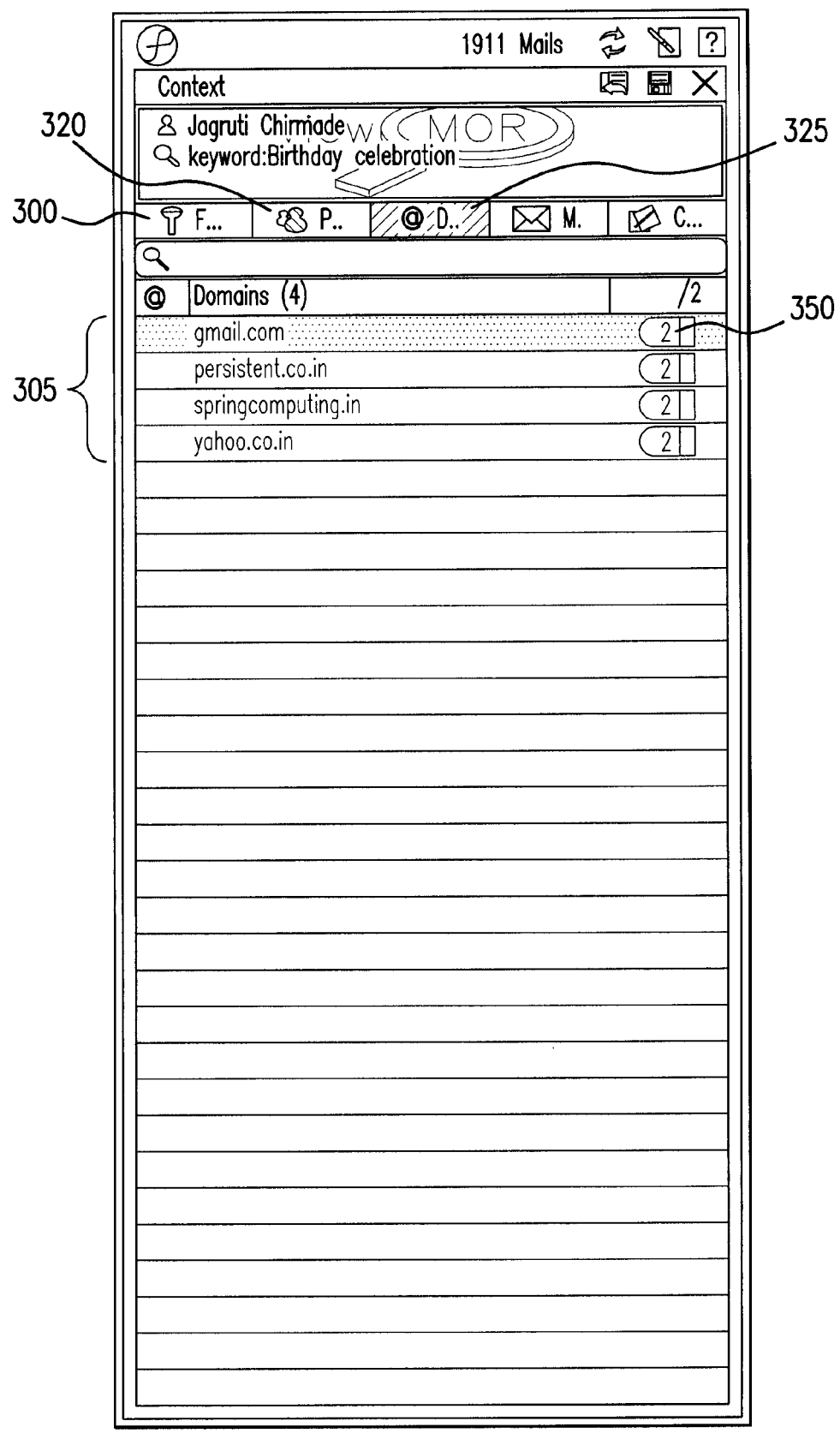
Figure 3D:
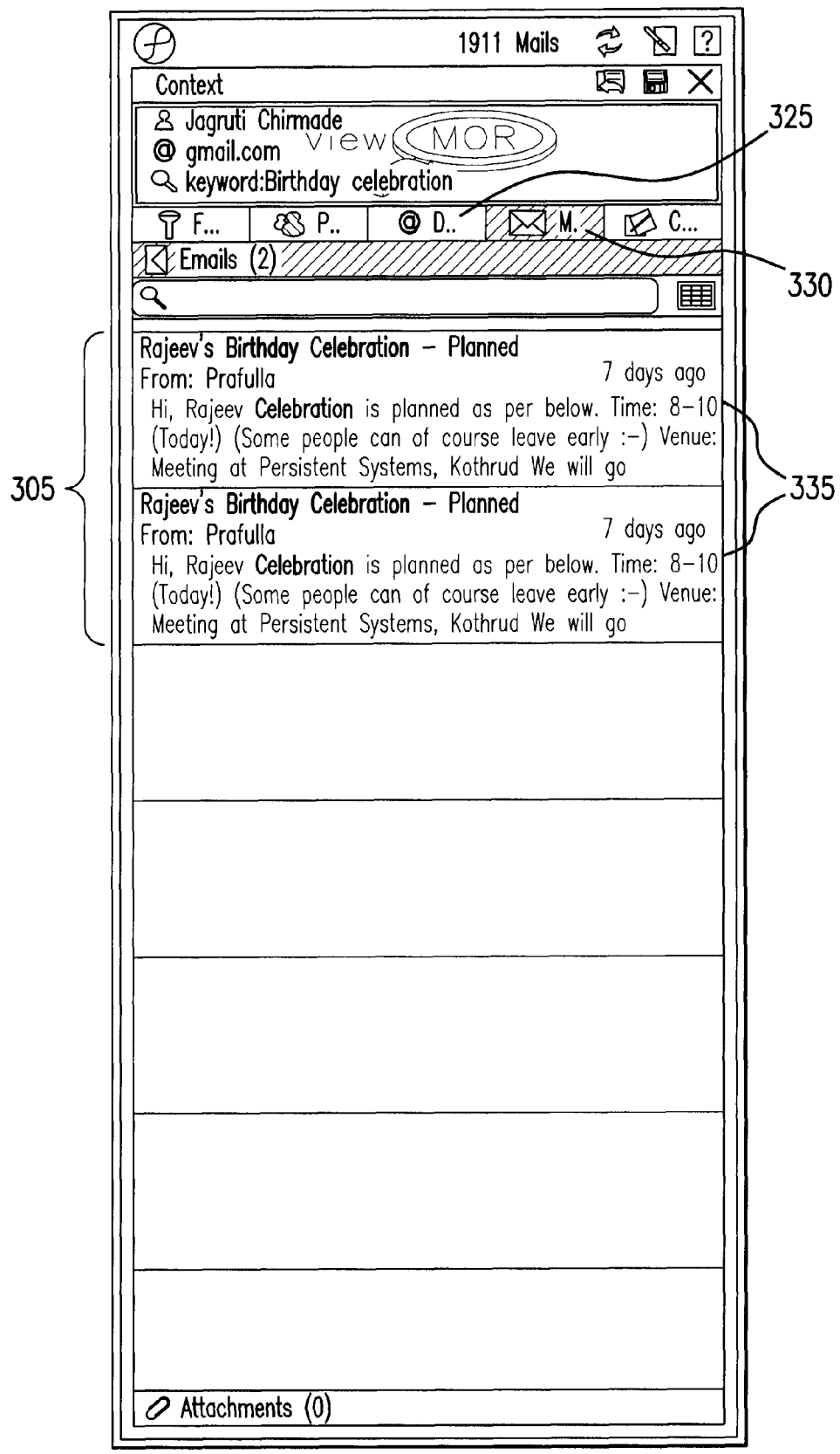
Figure 3E:
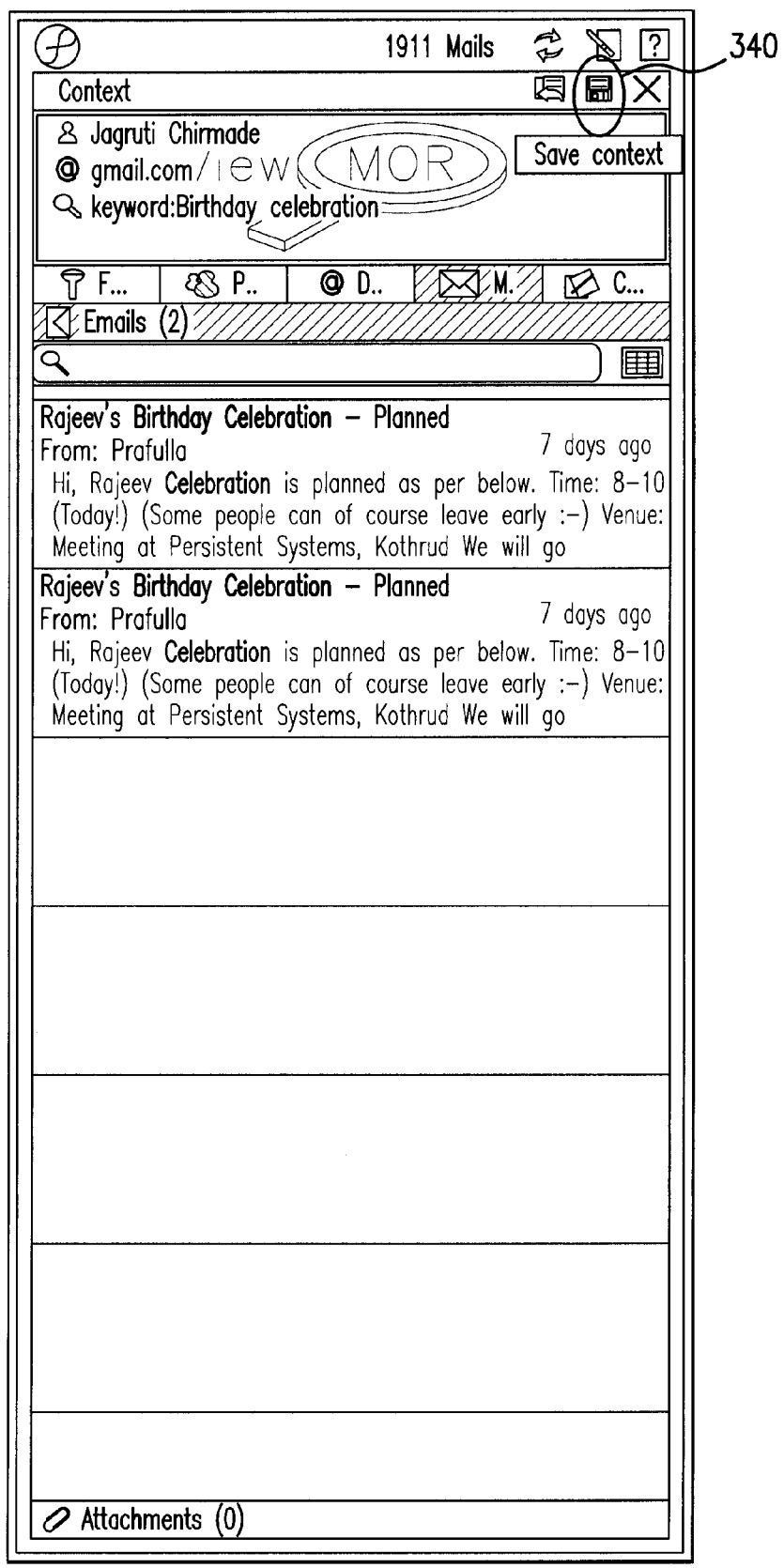
Figure 3F:
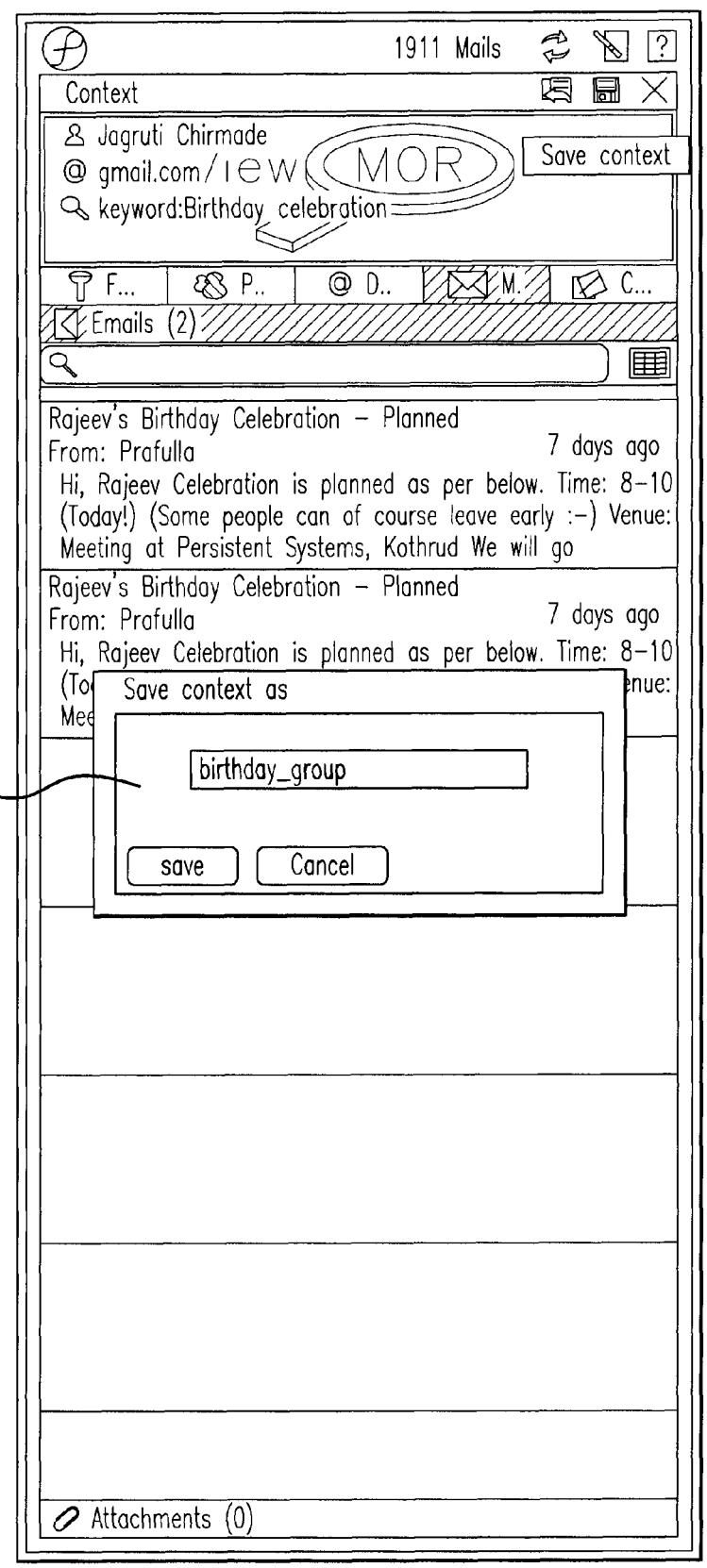
Figure 3G:
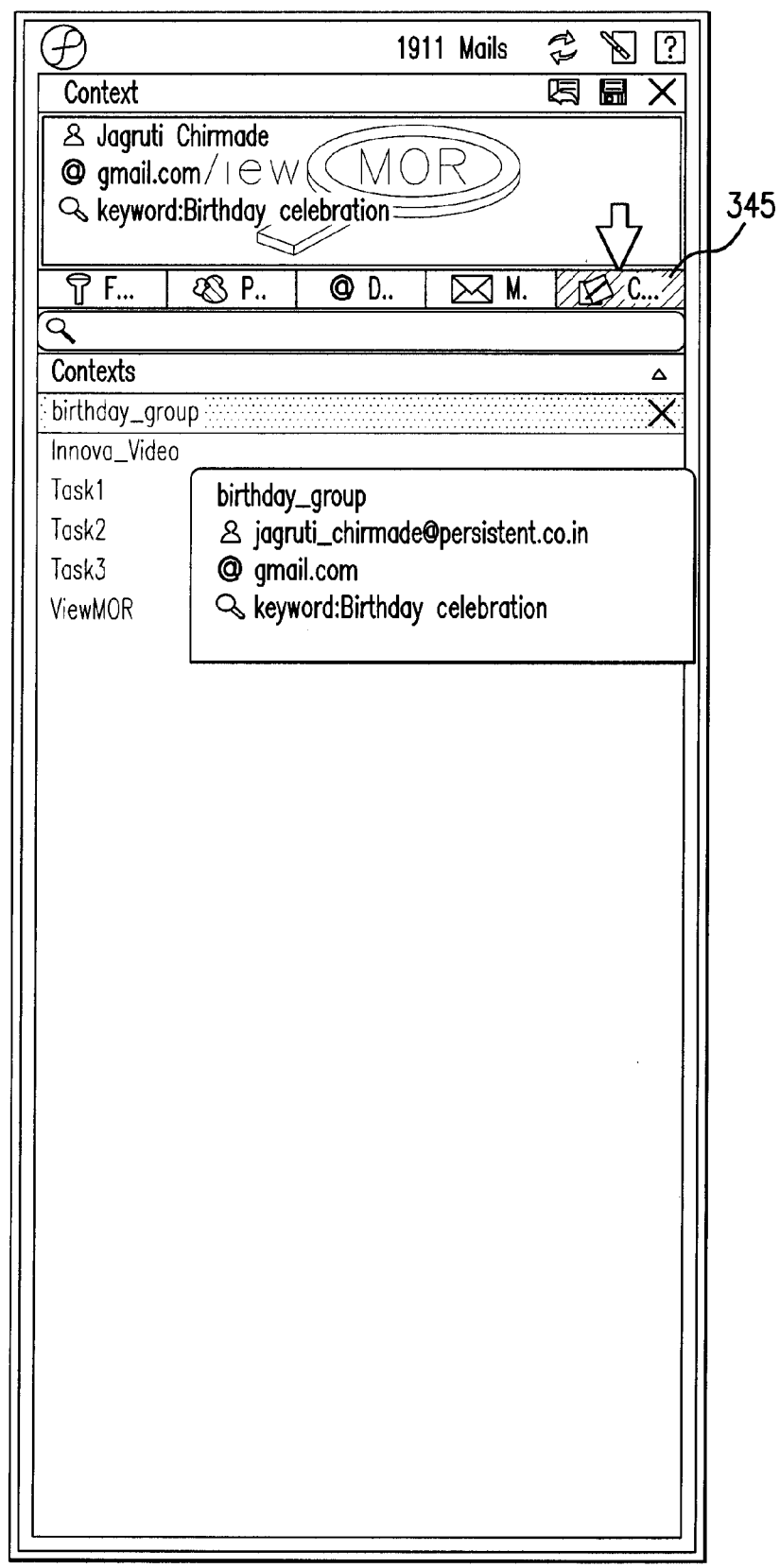

In FIG. 3a, a user starts the search by applying filters 300 (same as filters 220 in FIG. 2a) on the email communications 102 (refer FIG. 1) to generate a list 305 (refer FIGS. 3b to 3d) in a people based view 320, in domain based view 325, in mail based view 330 respectively. An illustration as is shown in FIG. 3a uses a keyword 310 "birthday celebrations" and inputs are provided by the user in form of choices made in the folders 315. As a next step, referring to FIG. 3b, list 305 is generated if the user switches between the filter 300 to people based view 320. The listing 305 can be further used to provide email communication or related data i.e. person who was concerned with the conversation thread. As a further step, referring to FIG. 3c, list 305 is generated if the user switches between the people based view 300 to domain name based view 325. The list 305 is generated providing the email communication or related data i.e. the domain names involved in the conversations. In an embodiment of the invention, the user can drill down or search on the search result. An illustrative implementation can be shown with reference to FIGS. 3c and 3d. If the user clicks on the number 350 or such other number as may be desired by the user, the user switches between the domain based view 325 to mail based view 330, and a list 305 is generated retrieving the email communications 335. If the user is satisfied with the search result 335, in an embodiment, the user can "save" this context for retrieving future new email communications 305 at later date, so that new email communications 305 that are downloaded can be automatically classified into matching context. Known means for "saving" 340 can be provided as has been illustrated in FIGS. 3e and 3f. Once, the context is saved, as is saved in the present example as "birthday_group", such customized or "created" and "saved" context is then available to the user for further use in a pre-determined context 345 as is shown in FIG. 3g.

Similar techniques, with necessary adaptations, can be adopted for retrieving email communications and related data such as attachments.

Figure 4A:
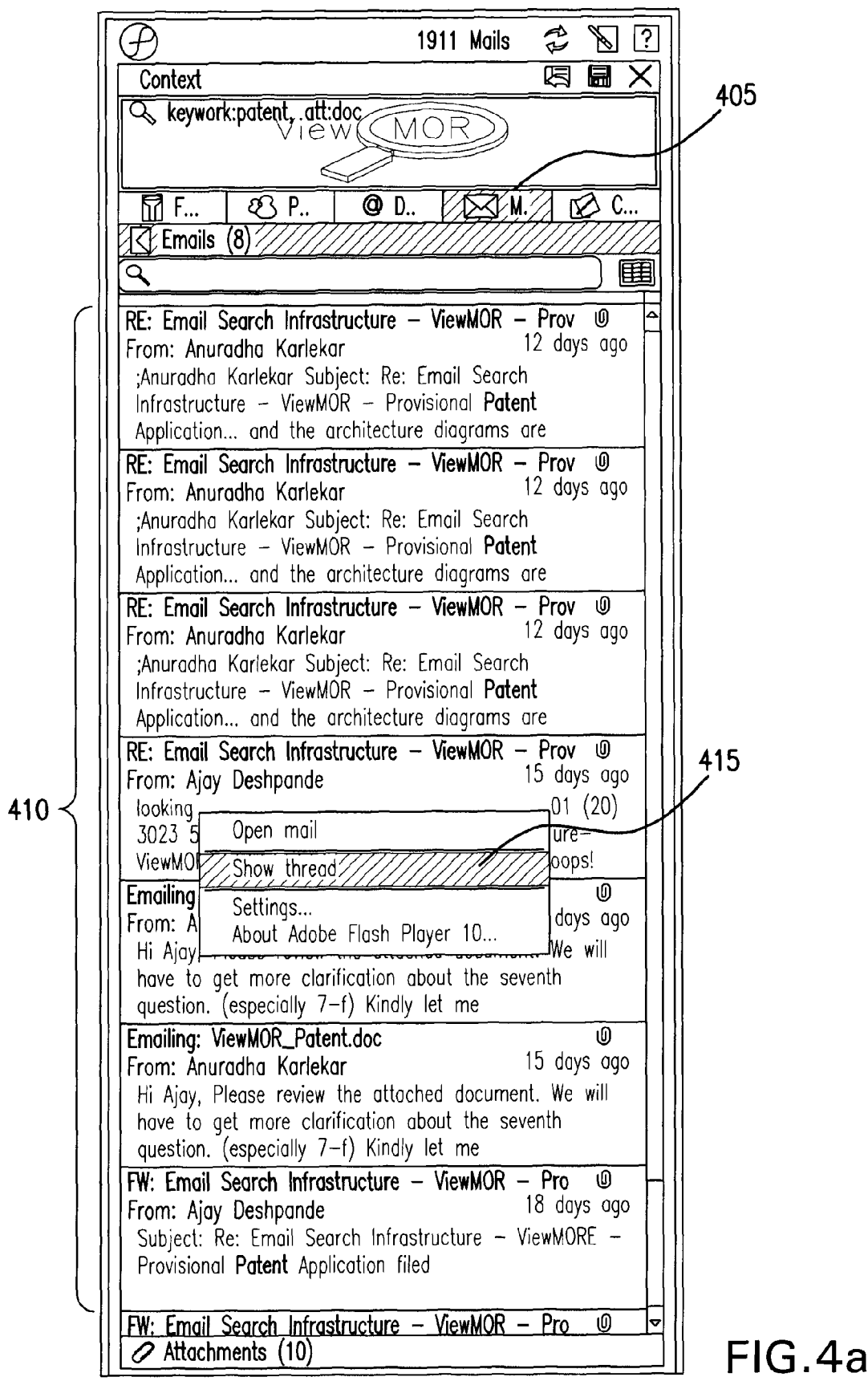
FIG. 4a, 4b illustrates methods and techniques to retrieve email communications and related data such as conversation threads in accordance with the illustrative implementation of the present invention.
Figure 4B:
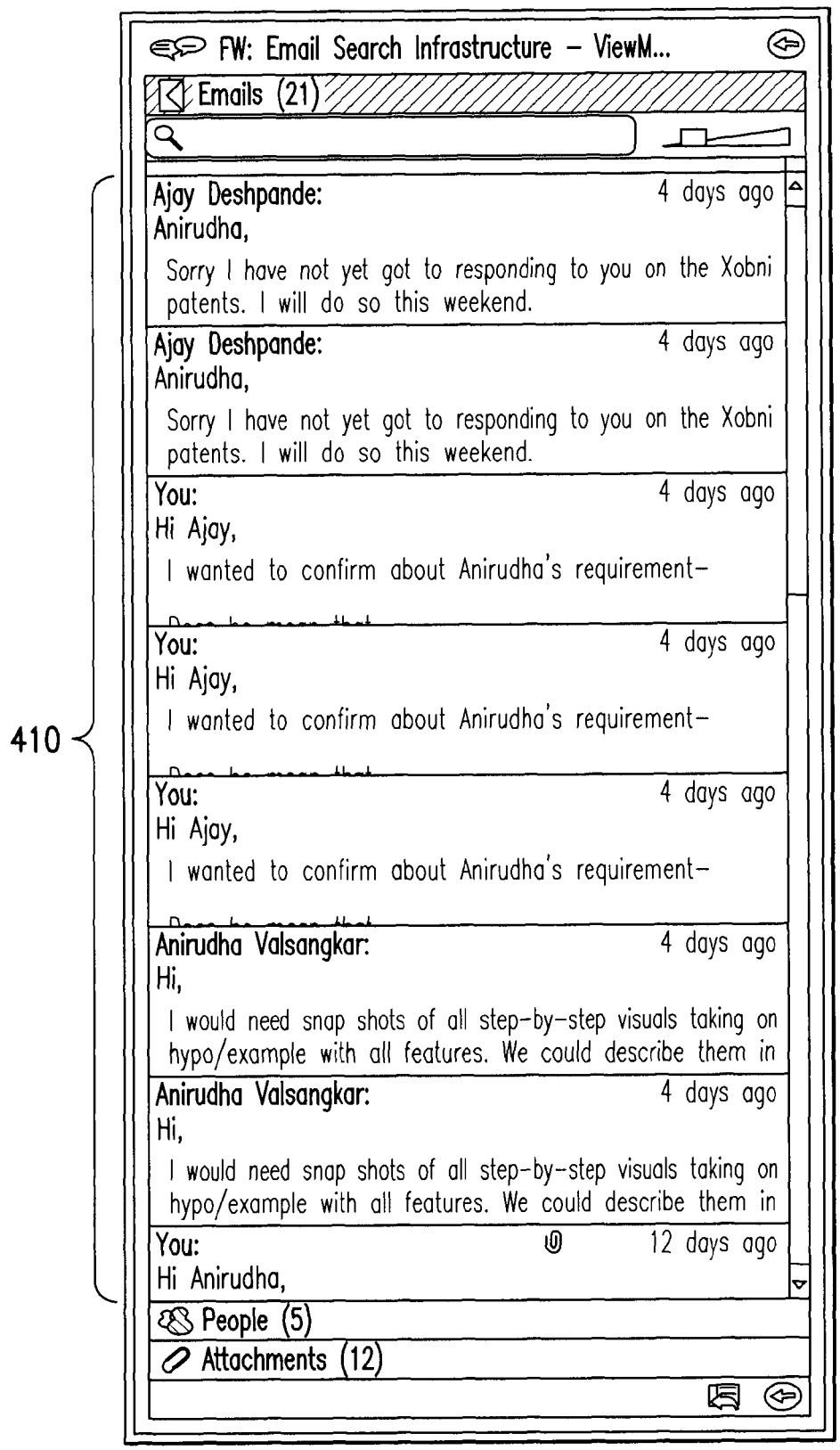

It is a feature of the invention to able to retrieve email communications and related data such as conversation threads. This feature of the invention is illustrated as shown in FIGS. 4a and 4b. With reference to FIG. 4a, the user can retrieve related data such as conversation threads based on the email communications. After the user chooses certain filters as desired and clicks the mail based view 405, a list 410 is generated comprising of email communications. The user is provided a mouse control whereby a command to show conversation thread is provided. Illustrative command is shown as command 415 in the FIG. 4a. As a result, with reference to FIG. 4b, conversation threads 410 is generated. The user may be further enabled, as an embodiment of the invention, to further view a particular email communication, if desired.

In one embodiment, such techniques and methods can be performed in an on-line environment.

According to the invention, various other added features and functions could be enabled for the investors for furtherance of the objectives of the invention. Although the techniques and methods disclosed herein are suitable for use by the user for email communications, they are suitable for use with any type of complex data. For example, the techniques and systems disclosed herein can be used with scientific, engineering, and other data intensive applications, without limitation.

Various embodiments of the invention have been described in fulfillment of the various aspects of the invention. It should be recognized that these embodiments are merely illustrative of the principles of the invention. Numerous modifications and adaptations thereof will be readily apparent to those skilled in the art without departing from the spirit and scope of the invention.

The methods and systems described herein can be performed in software on general purpose computers, servers, or other processors, with appropriate magnetic, optical or other storage that is part of the computer or server or connected thereto, such as with a bus. The processes can also be carried out in whole or in part in a combination of hardware and software, such as with application specific integrated circuits. The software can be stored in one or more computers, servers, or other appropriate devices, and can also be kept on removable storage media, such as a magnetic or optical disks.

It should be appreciated that various aspects of the claimed invention are directed to subsets and substeps of the techniques disclosed herein. Further, the terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. Accordingly, what is desired to be secured by Letters Patent is the invention as defined and differentiated in the following claims, including all equivalents.

What is claimed is:

1. A computer-implemented method of performing email communication search to create and save a search result context, comprising:
    accessing email communication and related data from a first data repository, wherein related data comprises people, groups, domains of email addresses and attachment of the email communications;
    generating and storing, in a second data repository, an index from the email communication and related data based on relationships entailed in the email communications, wherein the index is used for searching and creating contextual relationship; and
    retrieving desired email communications and related data, in response to a request based on at least one input from a user, the input comprising the user choosing at least one filter;

generating a contextual relationship from the index of the retrieved email communications, wherein the contextual relationship comprising a social network that represents a network of groups of people, groups of domains, and connection types; and generating a search result context based on the retrieved contextual relationship, email communications and related data, wherein the search result context can be displayed in people based view, domain based view, email based view or attachment based view;

processing the search result context by:

retrieving specific groups of people, groups of domains, or connection types relating to the search result context; and graphically representing the retrieved network of groups of people, groups of domains, or connection types to the user, the graphical representing including displaying icons that visually provide a conceptual map of the user of how each of the groups of people and groups of domains for which at least another user belonging thereto has communicated emails to/from the user are connected to the user;

displaying a people view textual list of persons who have communicated emails with the user, and displaying a numerical number of emails exchanged in current search result context between the user and each person listed in the people view textual list;

displaying a view of all the people related to the search result context and type of connection shared with the displayed people, where the type of connections displayed include a direct connection, a one-way connection, and an indirection connection, the one-way connection comprising the user either receiving or sending an e-mail communication, and indirect connection comprising hidden relationship without the user directly receiving or sending e-mail communication; and saving the search result context and automatically classifying new emails into the search result context based on matching contextual relationship.

2. The method of claim 1 wherein the email communication and related data is accessed from a corporate messaging server, or web based email server.

3. The method of claim 2 wherein multiple corporate messaging servers or web based email servers are searched when accessing the email communication and related data from the first data repository.

4. The method of claim 1 wherein email communication and related data accessed from a messaging server is updated at realtime.

5. The method of claim 1 wherein the relationships include email communication addresses or name of the person, related people, email communication, filters, number of persons involved in a conversation, attachments, from, to, cc, bcc, date, time, subject, headers, keywords in the communication, folders, conversation thread, and enhanced search including one or more of boolean search, fuzzy search, phrase search or wild card search.

6. The method of claim 5 wherein the relationships include filters, people view, domain based, mail based, and context based view.

7. The method of claim 5 farther comprising creating and saving relationships for future use.

8. The method of claim 7 wherein email communications and related data are automatically classified into matching contexts based on relationships created and saved for future use by the user.

9. The method of claim 1 wherein input of the user includes search in Boolean search, fuzzy search, phrase search and wild card search.

10. The method of claim 1 wherein the at least one filter includes email communication addresses or domain addresses or name of the person, related people, number of persons involved in a conversation, attachments, from, to, cc, bcc, date, time, subject, headers, keywords in the communication, folders, conversation thread, enhanced search such as boolean search, fuzzy search, or phrase search or wild card search.

11. The method of claim 10 where the at least one filter includes keyword search, from, to, cc, bcc, date, time, subject, headers, attachments, number of person involved in a conversation, email communication addresses or domain addresses or name of the person, or folders.

12. The method of claim 1 wherein retrieval of the desired communication comprises applying the at least one filter, simultaneously or at various levels, on the email communications to get search results.

13. The method of claim 12 wherein further search is performed on the search results comprising:

taking search results as input for a further search. including adding a person to context from a people view and adding a domain from a domain view; and choosing an email communication or attachment to get a thread related to that email communication or attachment which lists all the email communications in the thread along with a people group and attachment list exchanged in the thread in different views.

14. The method of claim 1 wherein retrieval of the desired email communication, person, or group is effected based on various inputs, the various inputs comprising person or domain search results from a person or domain based view, switching between different filters and relationships to get corresponding results.

15. The method of claim 1 wherein retrieval of the desired communication is effected by an individual as a part of a group.

16. The method of claim 1 wherein only a portion of the second data repository is used and wherein filters are applied only at runtime on the index stored in the second data repository when the user makes a request.

17. A computer-implemented system for performing email communication search to create and save a search result context, the system comprising:

one or more non-transitory computer storage medium stored thereon:

a first data memory that stores email communications and related data, wherein related data comprises people, groups, domains of email addresses and attachment of the email communications;

an index generator that generates an index from an email communication and related data based on relationships entailed in the email communications, wherein the index is used for searching and creating contextual relationship;

a second data memory that stores the index from the email communication and related data;

one or more processors connected with the one or more non-transitory computer storage medium to implement one or more modules that, in response to a request based on at least one input from a user, the input comprising the user choosing at least one filter, perform the functions of:

retrieving desired email communications and related data;

generating a contextual relationship from the index of the retrieved email communications, wherein the contextual relationship comprising a social network that represents a network of groups of people, groups of domains, and connection types;

generating a search result context based on the retrieved contextual relationship, email communications and related data, wherein the search result context can be displayed in people based view, domain based view, email based view or attachment based view;

processing the search result context by:

retrieving specific groups of people, groups of domains, or connection types relating to the search result context; and graphically representing the retrieved network of groups of people, groups of domains, or connection types to the user, the graphical representing including displaying icons that visually provide a conceptual map of the user of how each of the groups of people and groups of domains for which at least another user belonging thereto has communicated emails to/from the user are connected to the user;

causing a display to display a people view textual list of persons who have communicated emails with the user, and displaying a numerical number of emails exchanged in current search result context between the user and each person listed in the people view textual list;

causing the display to display a view of all the people related to the search result context and type of connection shared with the displayed people, where the type of connections displayed include a direct connection, a one-way connection, and an indirection connection, the one-way connection comprising the user either receiving or sending an e-mail communication, and indirect connection comprising hidden relationship without the user directly receiving or sending e-mail communication; and saving the search result context and automatically classifying new emails into the search result context based on matching contextual relationship.

18. The system of claim 17 further comprising
a second module that synchronizes new email communications and related data up-to-date in the second data memory.

19. The system of claim 17 further comprising
a plug-in module that invokes appropriate plug-ins based on a requirement of the user, wherein the plug-ins may be added at a runtime which may index emails to display results in different views.

20. The method of claim I wherein the retrieving is performed based only on filtering the stored index of the email communication and not based on emails themselves.

21. The system of claim 17, wherein at least one module responds to the request of the user by analyzing only the stored index and not analyzing emails themselves.

22. The method of claim 1, further comprising displaying the search result context in any one of a people based view, domain based view, email based view, or attachment based view.

23. The method of claim 1, further comprising:
prompting a user to save the specific group retrieved based on the search result context.

24. The method of claim 1, further comprising:
displaying all emails and attachments related to the specific group retrieved.

25. The method of claim 1, further comprising:
prompting a user to save the search result context; and
updating the list of emails from persons who have communicated emails based on the saved search result context.

26. The method of claim 1, wherein further search is performed using the search result context as an input for a next level search.

27. The method of claim 26, wherein the further search includes at least one of people, domains, attachment names, or emails.

28. The system of claim 17, wherein the display further displays the search result context in any one of a people based view, domain based view, email based view, or attachment based view.

29. The system of claim 17, wherein at least one module prompts a user to save the specific group retrieved based on the search result context.

30. The system of claim 17, wherein the display further displays all emails and attachments related to the specific group retrieved.

31. The system of claim 30, wherein the module applies different filters and search options on the displayed emails.

32. The system of claim 17, wherein at least one module prompts a user to save the search result context; and
the index generator updates the list of emails from persons who have communicated emails based on the saved search result context.

33. The system of claim 17, wherein at least one module performs a further search using the search result context as an input for a next level search.

34. The system of claim 33, wherein the further search includes at least one of people, domains, attachment names, or emails.

35. The system of claim 17, wherein at least one module performs a search to identify people and groups of people includes people and groups in a contact list of the user, and people and groups with which the user has exchanged email.

36. The system of claim 17, wherein the second data memory stores the contexts and filters, and the system further comprises a second module that synchronizes new email communications and related data up-to-date in the second data memory based on the stored contexts and filters.

* * * * *